Figure 1:
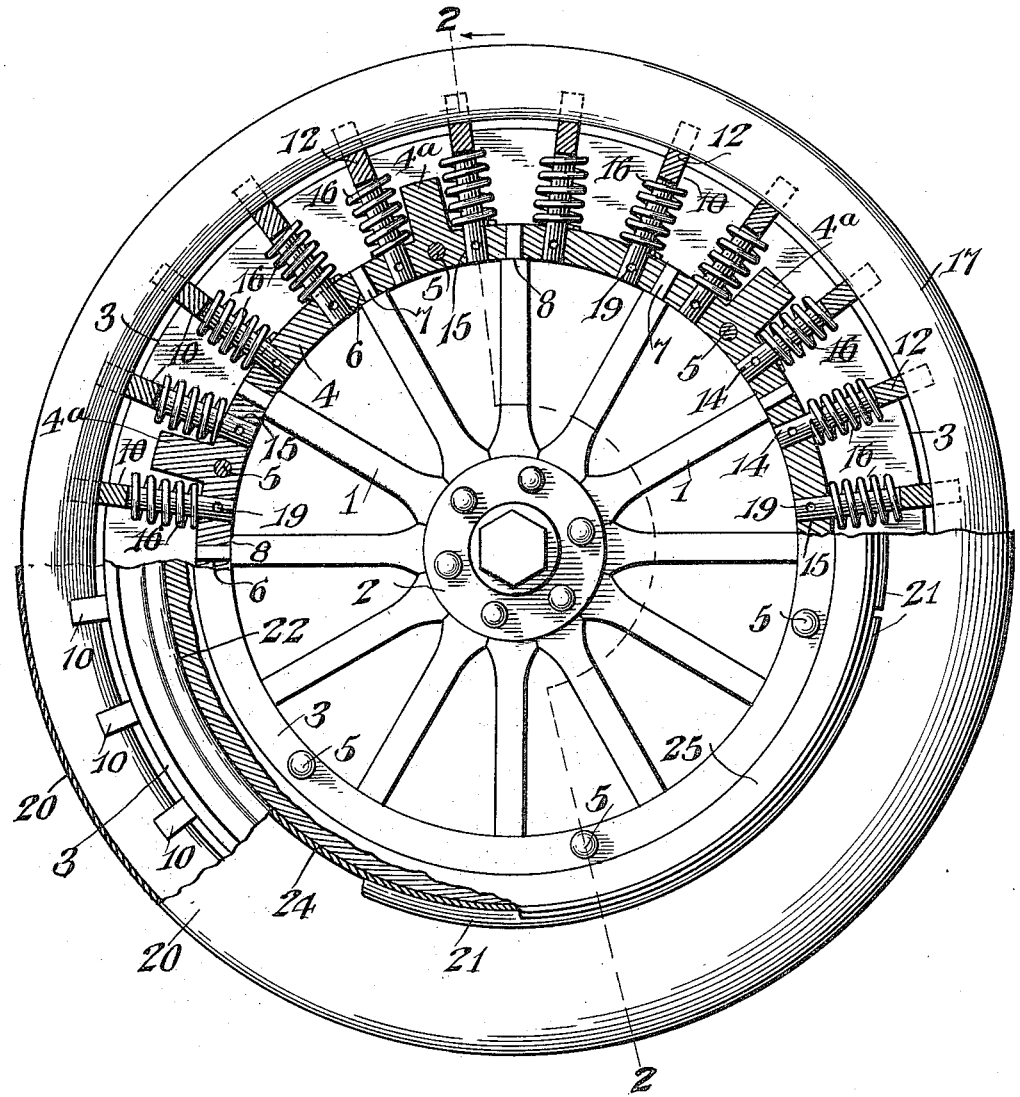

W. J. JONES.
RESILIENT WHEEL.
APPLICATION FILED MAY 16, 1912.

1,080,834.

Patented Dec. 9, 1913.
2 SHEETS—SHEET 1.

WITNESSES

William J. Jones, INVENTOR

BY

ATTORNEYS

W. J. JONES.
RESILIENT WHEEL.
APPLICATION FILED MAY 16, 1912.
1,080,834.
Patented Dec. 9, 1913.
2 SHEETS—SHEET 2.
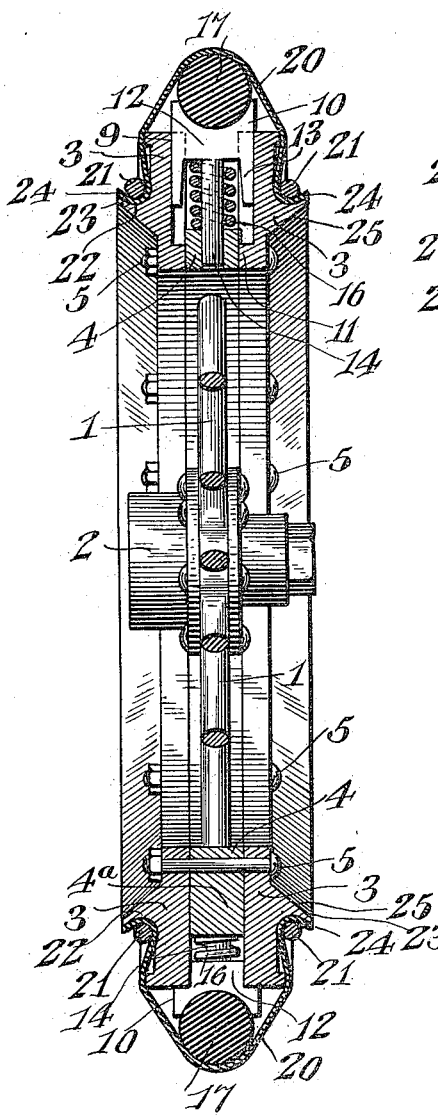
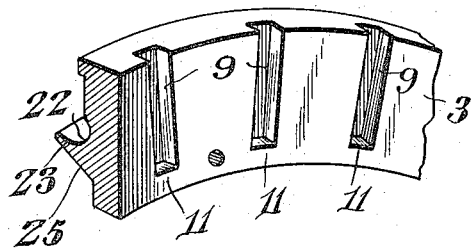
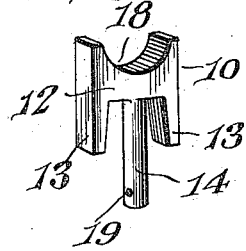
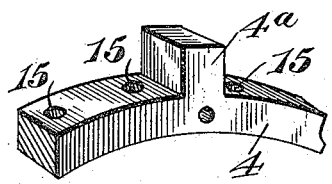
William J. Jones, INVENTOR

UNITED STATES PATENT OFFICE.

WILLIAM J. JONES, OF MARTINSVILLE, VIRGINIA.

RESILIENT WHEEL.

1,080,834.　　　　　Specification of Letters Patent.　　　Patented Dec. 9, 1913.

Application filed May 16, 1912. Serial No. 697,757.

*To all whom it may concern:*

Be it known that I, WILLIAM J. JONES, a citizen of the United States, residing at Martinsville, in the county of Henry and State of Virginia, have invented certain new and useful Improvements in Resilient Wheels, of which the following is a specification.

The invention relates to improvements in resilient wheels.

The object of the present invention is to improve the construction of resilient wheels, and to provide a simple, practical and efficient wheel of great strength and durability, designed for use on automobiles and various other vehicles and adapted to take the place of pneumatic tires, and capable of affording the desired elasticity and resiliency without being affected by punctures.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings: Figure 1 is a side elevation partly in section of a resilient wheel, constructed in accordance with this invention. Fig. 2 is a transverse sectional view on the line 2—2 of Fig. 1. Fig. 3 is a detail perspective view of a portion of one of the annular side sections of the rim. Fig. 4 is a detail perspective view of a portion of the intermediate annular section of the rim. Fig. 5 is a detail perspective view of one of the cushioned tire receiving shoes.

Like numerals of reference designate corresponding parts in all the figures of the drawings.

In the accompanying drawings in which is illustrated the preferred embodiment of the invention, the wheel has a rigid central portion composed of an annular series of wooden spokes 1, rigidly connected at their inner ends to a hub 2, but the rigid central portion of the wheel may be of any other preferred construction and may be made of any suitable material. The wheel is equipped with a metallic rim composed of spaced annular side sections 3 and an intermediate annular section 4, interposed between the inner portions of the annular side sections 3 and secured to the same by transverse bolts 5, or other suitable fastening devices, which pierce the inner portions of the said sections of the rim, as clearly illustrated in Fig. 2 of the drawings. The side sections are spaced apart to form a circumferential groove or channel by the central section 4, which is also provided at intervals with outwardly projecting radially arranged spacing lugs 4ª extending across the space between the side sections and presenting flat faces to the same. The intermediate annular section 4 is provided with an annular series of centrally arranged radial openings 6 forming spoke sockets and receiving the reduced outer ends 7 of the spokes, which are provided with shoulders 8 to fit against the inner peripheral edge of the intermediate section 4 of the rim.

The annular side sections 3 of the metallic rim are provided in their inner faces with oppositely disposed alined radial guide grooves 9, forming ways for the reception of shoes 10 and extending inwardly from the outer peripheral edges of the side sections to points intermediate of the inner and outer peripheral edges of the central section 4 and terminating short of the inner peripheral edges of the side sections to form inner end walls 11. The shoes 10, which are guided in the radial grooves 9, are disposed transversely of the rim of the wheel at regular intervals and each consists of a block or plate and comprising a head 12, side arms 13 and a central stem 14. The side arms, which extend inwardly from the side portions of the head, have straight side and outer faces, which are arranged in flush relation with the side faces and side edges of the head and with the latter snugly fit within the radial grooves of the side sections of the rim. The stems 14, which are round, are located equi-distant of the side arms and have their inner portions arranged within radial openings 15 of the central section of the rim. The openings 15 are arranged at regular intervals in an annular series around the rim, and coiled springs 16, which are disposed on the stems of the shoes, are interposed between the heads thereof and the said central section for cushioning a solid tire 17 of rubber, or other suitable material. The springs, which may be of any desired strength to secure the proper resiliency of the wheel, are located between the side arms 13.

The heads of the transversely disposed shoes are provided with alined segmental recesses 18, forming seats for the tire 17 and presenting curved faces to and conforming to the configuration of the tire. The shoes project beyond the side walls of the circumferential channel, and the solid tire, which is round, is normally supported beyond the rim by the shoes, and the springs permit the tire to yield in all directions, and the wheel is adapted to afford the resiliency of an ordinary pneumatic tire or even greater resiliency than the same without being affected by punctures. The stems 14 are provided at their inner ends with transverse perforations 19, and when it is desired to remove the tire the shoes may be compressed sufficiently to carry the perforations inwardly beyond the rim and by inserting a pin or key in the said perforations 19, the shoes may be held against outward movement until it is desired to replace the tire on the wheel.

The wheel is preferably equipped with a flexible covering 20, arranged on the tread of the tire and extending from the same inwardly on the outer faces of the side sections 3 to points intermediate of the inner and outer peripheral edges thereof and retained in place by split clamping rings 21. The clamping rings, which are constructed of resilient rod metal or other suitable material, are arranged in annular grooves 22 of ribs 23, and they clamp the side edges 24 of the covering in the said grooves. The ribs 22, which are annular, are formed integral with the side sections and have inclined side faces 25.

What is claimed is:—

1. A wheel of the class described including a rim having a circumferential channel and provided in the opposite walls thereof with radial guide grooves, an annular series of shoes consisting of transverse plates having recesses in their outer edges and provided with inwardly extending radially arranged side arms having straight side edges and guided in the grooves of the side walls of the channel, said shoes being also provided between the arms with radially arranged stems, springs mounted on the stems and cushioning the shoes, and a tire seated in the recesses of the shoes.

2. A wheel of the class described including a rim composed of side sections, and a central section arranged between the inner portions of the side sections and spacing the same to form a circumferential channel and provided therein with spacing lugs formed integral with the central section and projecting into the channel and extending entirely across the same, transverse fastening devices piercing the central section and passing through the side sections adjacent to the inner edges thereof, an annular series of shoes provided with inwardly extending radially arranged side arms having straight inner side edges and guided in the side sections, said shoes being also provided between the arms with radially arranged stems slidable through the central section of the rim, springs disposed on the stems and seated against the central section of the rim and arranged to urge the shoes outwardly, and a tire supported by the shoes.

3. A wheel of the class described including a rim composed of annular side sections having radial grooves in their inner faces and provided at their outer faces with exterior projecting annular ribs having annular grooves opening outwardly, a central section secured between the side sections and spacing the same to form a circumferential channel, radially movable shoes operating in the channel and guided in the inner radial grooves of the side sections, a tire mounted on and supported by the said shoes, means located within the channel for cushioning the shoes, a flexible covering extending across the outer face of the tire and having its side portions arranged within the annular grooves of the said exterior ribs, and fastening means for securing the flexible covering to the side section, said fastening means being located within the annular grooves of the ribs and protected by the latter.

In testimony whereof I affix my signature in presence of two witnesses.

WILLIAM J. JONES.

Witnesses:
C. W. JONES,
J. L. RICHARDSON.

Copies of this patent may be obtained for five cents each, by addressing the "Commissioner of Patents, Washington, D. C."